US011099113B2

(12) United States Patent
Nie et al.

(10) Patent No.: US 11,099,113 B2
(45) Date of Patent: Aug. 24, 2021

(54) DETECTION SYSTEM AND METHOD FOR CONCENTRATION FLUID NONMETAL PARTICLES

(71) Applicant: FATRI UNITED TESTING & CONTROL (QUANZHOU) TECHNOLOGIES CO., LTD., Fujian (CN)

(72) Inventors: Yongzhong Nie, Fujian (CN); Zhongping Zhang, Fujian (CN)

(73) Assignee: FATRI UNITED TESTING & CONTROL (QUANZHOU) TECHNOLOGIES CO., LTD., Quanzhou (CN)

( * ) Notice: Subject to any disclaimer, the term of this patent is extended or adjusted under 35 U.S.C. 154(b) by 0 days.

(21) Appl. No.: 16/487,931

(22) PCT Filed: Nov. 30, 2018

(86) PCT No.: PCT/CN2018/118697
§ 371 (c)(1),
(2) Date: Aug. 22, 2019

(87) PCT Pub. No.: WO2019/109872
PCT Pub. Date: Jun. 13, 2019

(65) Prior Publication Data
US 2020/0340905 A1  Oct. 29, 2020

(30) Foreign Application Priority Data
Dec. 5, 2017 (CN) .......................... 201711267524.7

(51) Int. Cl.
*G01N 15/06* (2006.01)
(52) U.S. Cl.
CPC . *G01N 15/0656* (2013.01); *G01N 2015/0668* (2013.01)

(58) Field of Classification Search
CPC ......... G01N 33/2858; G01N 33/54326; G01N 15/0656; G01N 15/02; G01N 15/06;
(Continued)

(56) References Cited

U.S. PATENT DOCUMENTS 5,001,424 A * 3/1991 Kellett .................... F16N 29/00
324/204
5,252,493 A * 10/1993 Fujiwara ................ G01N 21/51
356/337
(Continued)

FOREIGN PATENT DOCUMENTS

CN    202002870 A    10/2011
CN    102486448 A    6/2012
(Continued)

OTHER PUBLICATIONS

International Search Report for International Application PCT/CN2018/118697, dated Feb. 22, 2019.
(Continued)

*Primary Examiner* — Hoa Q Pham
(74) *Attorney, Agent, or Firm* — Burris Law, PLLC

(57) ABSTRACT

The present invention discloses a system for detecting the concentration of non-metal particles in a fluid and detection method thereof. The detection system comprises a particle morphology detection device, a metal particle detection device, and a detection pipeline, the particle morphology detection device and the metal particle detection device being connected to each other and wound around the detection pipeline. The detection method comprises: S1, detecting the concentration of fluid particles; S2, detecting the concentration of fluid metal particles; and S3, detecting concentration of fluid non-metal particles. By means of the detection system and the detection method, the concentra-
(Continued)

tion of non-metal particles in a fluid can be more accurately detected, and the detection accuracy is improved.

22 Claims, 6 Drawing Sheets

(58) Field of Classification Search
CPC ....... G01N 15/1459; G01N 2015/0668; G01N 2015/0693; G01N 2015/0053; G01N 2015/1403; G01N 2015/1486; G01N 27/023; G01N 21/49; G01N 21/53
USPC .......................... 356/335–343, 432–440, 73
See application file for complete search history.

(56) References Cited

U.S. PATENT DOCUMENTS

| | | | |
|---|---|---|---|
| 8,115,478 B2 * | 2/2012 | Fujii | G01N 3/56 324/204 |
| 2009/0033935 A1 * | 2/2009 | Chung | G01N 21/1717 356/338 |
| 2009/0051350 A1 | 2/2009 | Becker et al. | |
| 2014/0152986 A1 * | 6/2014 | Trainer | G01N 15/0211 356/336 |
| 2020/0056975 A1 * | 2/2020 | Nie | G01N 15/0656 |
| 2020/0340902 A1 * | 10/2020 | Nie | G01N 15/06 |

FOREIGN PATENT DOCUMENTS

| | | |
|---|---|---|
| CN | 102636422 | 8/2012 |
| CN | 103308431 | 9/2013 |
| CN | 103592208 | 2/2014 |
| CN | 108051348 | 5/2018 |
| JP | 3130867 | 1/2001 |

OTHER PUBLICATIONS

Extended European Search Report of counterpart European Application No. 18885474.9, dated Dec. 17, 2020.

* cited by examiner

DETECTION SYSTEM AND METHOD FOR CONCENTRATION FLUID NONMETAL PARTICLES

CROSS-REFERENCE TO RELATED APPLICATIONS

This application is a U.S. national phase application of International Application No. PCT/CN2018/118697, filed on Nov. 30, 2018, which claims priority to and the benefit of Chinese Patent Application No. 201711267524.7, filed on Dec. 5, 2017. The disclosures of the above applications are incorporated herein by reference.

FIELD

The present disclosure relates to the technical field of fluid detection, and more particularly to a system for detecting the concentration of non-metal particles in a fluid, and further provides a detection method using the detection system.

BACKGROUND

The statements in this section merely provide background information related to the present disclosure and may not constitute prior art.

Currently, there are many methods for detecting the concentration of metal particles in a fluid, but there are few methods for detecting the concentration of non-metal particles in a fluid. Some methods directly measure non-metal particles, but the particles in a fluid have different shapes and materials and easily interact with each other, thus resulting often in poor measurement results. Therefore, it may be a preferred embodiment to measure respectively all the particle information in a fluid and particularly the metal particles and then subtract.

For the detection of metal particles in a fluid, a method for detecting metal particles by using the electromagnetic induction principle is a more typical method. Specifically, a typical device for detecting metal particles by applying electromagnetic induction usually adopts two reversely wound excitation coils as excitation sources to generate two magnetic fields with the same strength and opposite directions, and under the condition of no magnetic field disturbance, the net magnetic field between the two coils is zero; an induction coil for responding to magnetic field change is wound in therebetween and used for responding to magnetic field disturbance caused by metal particles. Although this device enables electromagnetic detection of metal particles, the device still suffers from the following defects:

(1) In order to establish magnetic field balance and induce magnetic field signals of metal particles, two reverse excitation coil and one induction coil are needed, but such a configuration results in longer length of the sensor, being disadvantageous to actual design, preparation, installation and use;

(2) Only one magnetic induction coil is adopted, when electromagnetic induction is applied for establishing magnetic field balance, the attenuation of the magnetic field outside the excitation coil (magnet excitation coil) is obvious, the magnetic field disturbance generated by small particles on the excitation coil is often attenuated greatly when showing on the external induction coil, consequently the detection accuracy of the small particles is insufficient, which affects the detection.

For the detection of particles in a fluid, in the prior art of particle morphology detection device, the laser tube is often fixed, and the particles vary in size, resulting often in a not uniform distribution of particles in the cross section of one oil pipeline. Therefore, the fixed laser tube arrangement may lead to fixed options of a detection plane, and it is difficult to accurately detect the particle morphology in the lubricating oil, so that the measurement accuracy of the particle concentration in the lubricating oil is not enough.

SUMMARY

In order to overcome the defects of the prior art, the technical problems to be solved by the invention are how to provide: (1) a detection system capable of improving the detection accuracy of non-metal particle concentration in a fluid, and (2) a method for using the system to improve accuracy of the concentration detection.

In order to solve the first technical problem, the technical solution adopted by the invention is as follows: A system for detecting the concentration of non-metal particles in a fluid, comprising a particle morphology detection device, a metal particle detection device, and a detection pipeline, wherein the particle morphology detection device and the metal particle detection device are connected to each other and wound around the detection pipeline;

The particle morphology detection device comprises: a laser tube for outputting an incident light beam; and a scatter detector for detecting an emergent light beam from a fluid;

The metal particle detection device comprises a signal detection system, an excitation coil and a positive even number of induction coils, wherein the excitation coil is connected with the signal detection system and wound around the detection pipeline; the induction coils are connected with the signal detection system and wound around the excitation coil sequentially and reversely with respect to each other;

The detection pipeline allows the light beam of the particle morphology detection device to be incident on and emergent from the fluid in the pipeline.

It should be noted that for the detection device of metal particles, generally, in the technical solution of the existing device for detecting particles through electromagnetic induction, two reverse excitation coil that are wound at both ends of the pipeline reversely with respect to each other and externally to the pipeline and one induction coil that is wound between the two excitation coil are required for installation. However, in the present technical solution, the arrangement that the induction coil is wound externally to the excitation coil of the device can achieve the effects that the installation is facilitated, the overall length of the sensor is greatly shortened, and the device is convenient to prepare and use.

The excitation coil is connected with the signal detection system, and the signal detection system inputs a sinusoidal alternating signal at both ends of the excitation coil to generate an alternating magnetic field and drive the induction coil. In addition, with the induction coil wound around the detection pipeline, the condition of particles can be detected without contacting the sensor directly with liquid in the pipeline, which facilitates the detection.

In order to achieve an improved detection accuracy, the inventor adopts a positive even number of magnetic induction coils in the solution of the invention. Generally, in the prior art, only one magnetic induction coil is wound, which seemingly saves the costs, but in fact renders an insufficient accuracy of the size of the induced particles, because the induction coil is positioned between the two excitation coil to sense the magnetic field disturbance generated by the induction particles through the excitation coil, but the induction coil is far away from the excitation coil, always resulting in a great magnetic field attenuation.

However, in the present technical solution, the excitation coil is adopted and a positive even number of induction coils are used for winding on the excitation coil so as to ensure the detection accuracy. The excitation coil is used to generate a magnetic field and therefore preferably one excitation coil is used for winding. The use of an even positive number of induction coils, such as two or a group of induction coils, can be adapted to the algorithm subsequently set by the inventor to calculate the concentration of metal particles by observing and inputting changes in the magnetic field obtained by the two induction coils.

The induction coils are sequentially wound around the excitation coil. In this arrangement, magnetic field disturbance generated when particles pass through the induction coils can be quickly detected, so as to achieve the detection of metal particles.

The induction coils are wound reversely with each other on the excitation coil. Due to the proximity of the induction coils, the environment of the induction coils can be considered to be consistent, temperature drift and electromagnetic interference can be restrained in a complex and severe environment, and thus signal stability is enhanced and system performance is further improved.

It should be noted that a coil refers to a length of coil connected at both ends to the signal detection system and wound around the detection pipeline.

It should be noted that winding sequentially means, for example, after completion of winding one of the two induction coils, winding the other induction coil in the direction of the detection pipeline from the next position in this direction, i.e., one induction coil does not coincide with the other, but independently wound around the pipeline.

It should be noted that winding reversely means that the two induction coils do not coincide with each other while being wound externally to the excitation coil, one in the clockwise direction and the other in the counterclockwise direction.

It should be noted that the detection of particles, as used herein, refers to the detection of, for example, metal particles by means of electromagnetic induction, specially of the flow thereof, so as to facilitate the further analysis of the concentration of metal particles matter in a liquid, and the like.

It should be noted that the signal detection system detects electromagnetic induction conditions, and in an alternative embodiment, includes a control circuit board, a signal output port, etc. It should not be limited to the manner in which a signal detection system is constructed, any mechanism capable of detecting the electromagnetic change of the induction coils is supposed to be the signal detection system.

Preferably, the number of induction coils is two or four or six.

In order to optimally balance the installation and manufacturing costs and the detection accuracy, it would be preferable to set the number of the induction coils as two.

Alternatively, the number of the induction coils is set as four or six or the like, multiple times of measurement and averaging can be carried out in the measurement process to improve the reliability of detection.

Preferably, the excitation coils are two or more, and are wound around the detection pipeline in the same direction.

It should be noted that winding in the same direction means that each excitation coil is wound clockwise or counterclockwise around the detection pipeline. This arrangement can increase the magnetic field strength, and meanwhile the mutual interference among the excitation coil can be prevented and the stability of the magnetic field can be free from influence.

Preferably, the excitation coil and/or the induction coils are wound in at least one layer.

The excitation coil and/or the induction coils are wound in at least one layer (i.e., multiple layers), so that the strength of the magnetic field generated by the excitation coil can be further increased, signals generated on the induction coil are more obvious, and the detection accuracy of the metal particles is improved.

Preferably, a spacer ring sleeve is further arranged between the excitation coil and the induction coils;

Further preferably, the spacer ring sleeve is made of a non-magnetic conductive material.

A spacer ring sleeve is additionally arranged between the excitation coil and the induction coils and used for isolating the excitation coil and the induction coils. The non-magnetic conductive material herein is mainly used for isolating the excitation coil and the induction coils during winding in the production and manufacturing process, because trying to reduce the magnetic field loss between the induction coils and the excitation coil in the process of responding to the magnetic field disturbance generated by the metal particles is advantageous for improving the detection accuracy of metal particles; meanwhile, as a frame around which the induction coils are wound, the spacer ring sleeve can improve the flatness during winding the induction coils.

Preferably, a shielding ring is arranged outside the induction coils.

Due to the fact that the shielding ring is arranged outside the induction coil, the external magnetic field can be isolated, and the interference of the external magnetic field is prevented, rendering a more accurate detection result and a better detection effect.

Preferably, the particle morphology detection device further comprises a drive unit for driving the laser tube to move.

It should be noted that, for the particle morphology detection device, in the prior art of the particle morphology detection device, the laser tube is fixed, and the output light beam is fixed at a certain position, therefore the detected particles are only limited to this position. Due to the fact that the masses of the particles are different, the particles can form layering in the fluid according to their masses, the existing device may be limited in a narrow detection range, with relatively partial particles detected, so that the detected fluid transparency is not accurate enough. Therefore, the inventor creatively proposes that the laser tube fixed before is arranged to be movable, and the drive unit is used for driving the laser tube to move, so that the output light beam from the laser tube can cover the detection pipeline, the particles flowing through the whole detection pipeline are all detected, the obtained light intensity is more accurate, and the technical effect of improving the detection accuracy is further achieved.

Further preferably, the drive unit is an electric motor.

As one embodiment, an electric motor may be provided in the detection device for driving the laser tube to move, resulting in movement of the output incident light beam.

Furthermore, the movement of the laser tube is a lead screw movement or a gear movement.

The lead screw movement means that, in one embodiment, a nut is provided on the laser and the electric motor drives the screw to match the nut, thereby realizing movement.

The gear movement means that the electric motor and the laser tube are both provided with gear-shaped structural parts which are mutually matched to realize movement.

Preferably, the movement range of the laser tube is the diameter of the cross section of the detection pipeline.

Defining the movement range of the laser tube as the diameter of the cross section of the detection pipeline can ensure that the detection pipeline can be covered to a greater extent, the fluid in the pipeline can be fully covered by the light beam, so that a full detection of particles in each layer is achieved, and the detection accuracy is improved.

Preferably, the movement of the laser tube is at a constant velocity.

In the process of movement at a constant velocity, the signal of the sampled particle is relatively stable, so that the accuracy of detection and analysis results is higher.

Preferably, the scatter detector is positioned out of the straight line with the output beam from the laser tube.

The scatter detector is used to identify the size and shape of particles. In a preferred embodiment, the scatter detector is positioned out of the straight line with the output beam from the laser tube, because if the scatter detector is positioned in the same straight line with the output beam from the laser tube, the scatter detector is low in sensitivity to receive the beam and is easily disturbed by the direct beam. Instead of being in the same straight line, interference of light beams can be reduced, thus rendering a more accurate detection of the scattered light beam.

Further preferably, the scatter detector is arranged in a plane perpendicular to the output beam from the laser tube, and the scatter detector, the detection pipeline and the laser tube form a right-angle shape with each as a vertex.

An experiment shows that the interference of the direct beam can be avoided to a greater extent by setting the above-mentioned position relation, and the scattered beam can be detected accurately.

In order to solve the second technical problem, the technical solution adopted by the invention is as follows:

A method for detecting the concentration of non-metal particles in a fluid applying the above-described detection system, the method comprising the steps of:

S1: detecting the concentration of particles in a fluid, specifically comprising:

S11: introducing a pure fluid into a detection pipeline to obtain a scatter background noise value $U_{background\ noise}$ output by the particle morphology detection device;

S12: introducing a fluid to be detected into the detection pipeline, obtaining scatter signals output by the particle morphology detection device, and obtaining voltage signals of standard particles;

S13: sampling signals of the fluid in a certain period of time, extracting effective signals, carrying out threshold value analysis on the effective signals $U_x$ obtained by sampling, and obtaining the number of particles present in the period of time; and S14: obtaining the concentration of the particles in the fluid according to the number of particles in S13;

And,

S2: detecting the concentration of metal particles in a fluid, specifically comprising:

S21: acquiring an output signal of the signal detection system to obtain a voltage amplitude change;

S22: detecting the metal particle concentration according to the obtained voltage amplitude change;

And,

S3: detecting the concentration of non-metal particles in a fluid, specifically comprising:

Acquiring the fluid particle concentration obtained in S1 and the fluid metal particle concentration obtained in S2, and the concentration of non-metal particles in the fluid is obtained through subtracting, namely:

The concentration of non-metal particles in the fluid=the fluid particle concentration− the fluid metal particle concentration.

It should be noted that the certain period of time in S1 may refer to any period of time, which may be chosen according to the actual situation.

The inventor has made the following improvements in order to solve the technical defects mentioned in the background and to more accurately detect the concentration of non-metal particles in the fluid:

(1) Improvements to particle morphology detection device and application thereof, with the detection accuracy of the fluid particle concentration improved;

(2) Improvements to metal particle detection device, with an improved accuracy of the detection of the fluid metal particle concentration;

(3) Improvements to the method for detecting the concentration of particles in a fluid, including obtaining a scatter background noise value $U_{background\ noise}$ output by a detection device, and removing the influence caused by the background noise value in a subsequent detection calculation process, thereby improving the accuracy of the detection and calculation of the concentration of particles in the fluid.

Through the above improvements, an improved accuracy of the detection of non-metallic particle concentration in the fluid is achieved.

Preferably, in S1, the standard particles are selected from particles having a diameter of 10 μm, with a corresponding voltage signal of $U_{10\ \mu m}$.

In the technical solution, particles with a diameter of 10 μm are preferably selected as standard particles, so that on one hand the detection accuracy can be improved, and on the other hand the detection sensitivity can be improved. If the particles are too large, the detection accuracy for the subsequent concentration calculation is decreased, and if the particles are too small, the detection sensitivity of the device is decreased, as a result the particle detection may fail. Therefore, the detection accuracy and the detection sensitivity can be effectively balanced by taking particles with a diameter of 10 μm as standard particles by the inventor, thereby rendering a more accurate detection process.

Preferably, in S1, the effective signal is extracted by comparing the sampled signals with the scatter background noise value, and selecting signals greater than the scatter background noise value as effective signals.

In the technical solution, it is necessary to select an effective signal as a basis for subsequent calculation, otherwise the accuracy of the detection and calculation results would be affected. The inventor selects a simple and effective method for selecting an effective signal, namely the sampled signals are compared with the previously obtained scatter background noise value, and signals greater than the scatter background noise value are used as the effective signals, so that the sampled signals show more practicability, and the subsequent measurement result is more accurate.

Preferably, the step of obtaining the number of particles through a threshold analysis in S13 comprises the step of:

Comparing the obtained signal $U_x$ with a background noise value $U_{background\ noise}$, if $U_x-U_{background\ noise}>0$, adding 1 to the count, and if $U_x-U_{background\ noise}<0$, the count being zero.

In this step, as to the counting method, the inventor chooses preferably to compare the signal value with the background noise value instead of directly taking read-out values of the signal as the count, so that errors caused by the background noise value can be eliminated, that is, only signals when $U_x - U_{background\ noise} > 0$ are counted as representing particles, thereby rendering a more accurate detection result and an improved detection accuracy of the concentration of the particles.

Preferably, the step to obtain the particle concentration in S14 comprises the steps of:

S141: calculating the volume $V_x$ of the particles:

$$V_x = K \times V_{10\ \mu m} \times \sqrt{\frac{U_x - U_{background\ noise}}{U_{10\ \mu m} - U_{background\ noise}}}$$

where $V_x$ represents volume of unknown particles; K represents a sensor correction coefficient; $V_{10\ \mu m}$ represents standard particle volume; $U_x$ represents output voltage amplitude of an unknown volume of particles; $U_{10\ \mu m}$ represents output voltage amplitude of standard particles; and S142: obtaining the concentration of fluid particles:

Obtaining the fluid flow velocity v, the cross-sectional area S of the detection pipeline, converting the number and volume of particles passing through the pipeline in a period of time t into a total mass $m_{total}$, and obtaining the particle concentration $c_{total}$ through the following formula:

$$c_{total} = \frac{m_{total}}{v \times t_{total} \times S}.$$

It should be noted that the sensor correction coefficient K is introduced herein for the situation that in the calibration and use of the sensor, a background noise calibration offset may inevitably occur and generate errors in measurement, the correction coefficient K can be fine-tuning in this situation; it is also possible that when standard particles are selected, the particles are not completely standard, resulting in some subtle volume calculation errors, in this case, the errors can also be corrected by introducing the correction coefficient K.

In this step, elimination the influence of the background noise value is also taken into consideration, so that the detection result is more accurate. As in the above-mentioned calculation formula of the particles, factors of subtracting $U_{background\ noise}$ from $U_x$ and subtracting $U_{background\ noise}$ from $U_{10\ \mu m}$, thereby rendering a calculated volume of the particles closer to the actual value, and improving the calculation accuracy of the concentration of the particles in the fluid.

Preferably, detecting the metal particle concentration in S2 comprises the steps of:

obtaining the flow velocity $v_{metal}$ of the metal particles passing through the induction coils;

obtaining the mass $m_{metal}$ of the metal particles; and calculating the concentration of the particles $c_{metal}$ on the basis of the flow velocity $v_{metal}$ of the metal particles, the mass $m_{metal}$ of the metal particles, the elapsed time t and the cross sectional area S of the pipeline by using the following formula:

$$c_{metal} = \frac{m_{metal}}{v_{metal} \times t_{metal} \times S}.$$

During the process of obtaining the mass $m_{metal}$ of the metal particles, in the single-layer densely wound coil, the induction voltage E caused when the metal particles pass through the spiral coil induction coil is directly proportional to the volume V, the magnetic conductivity, the passing speed of the particles v, and the third power of the winding density of the coil. Through quantitative analysis on the output signal of the sensor, the volume and the mass of the metal particles flowing through the lubricating oil pipeline can be calculated through conversion.

It should be noted that the elapsed time $t_{metal}$ refers to the time required for the passage of the metal particles in the pipeline over a certain distance, which may correspond to the elapsed time between different amplitudes, or to the difference between the times of different amplitudes.

Preferably, the method of obtaining the metal particle flow velocity $v_{metal}$ comprises the steps of:

Respectively recording the times when the voltage amplitude of the metal particles passing through a group of induction coils measured by the signal detection system is at the highest point and at the zero point during the positive half cycle, and calculating the time difference value $\Delta T_1$ and the length $L_1$ of the corresponding induction coils; respectively recording the times when the voltage amplitude, measured by the signal detection system, is at the zero point and at the highest point during the negative half cycle, and calculating the time difference value $\Delta T_2$ and the length $L_2$ of the corresponding induction coils; and Obtaining the flow velocity according to this formula:

$$v_{metal} = \frac{\frac{k_1 \times L_1}{\Delta T_2} + \frac{k_1 \times L_1}{\Delta T_2}}{2}$$

It should be noted that $L_1$ refers to the length of the induction coils during the passage starting with the voltage amplitude at the highest point and ending with the voltage amplitude at the zero point during the positive half cycle; $L_2$ refers to the length of the induction coils during the passage starting with the voltage amplitude at the zero point and ending with the voltage amplitude at the highest point during the negative half cycle.

The term $k_1$ refers to a correction coefficient when passing through a coil; $k_2$ refers to the correction coefficient when passing the other coil.

Because different factors such as the wire (thickness, material) of each lubricating oil sensor, the number of winding turns and the interaction between the two induction coils affect the output signal, making the sensor fail to sense the middle of the induction coils, the correction coefficient $k_1$ or $k_2$ is introduced to correct the output signal.

More specifically, when ferromagnetic particles pass through the two induction coils, they sequentially pass through the induction coil 1 and the induction coil 2, and during the passage through the induction coil 1, if the influence of the induction coil 2 on the induction coil 1 is not considered, the highest point of the output signal may occur in the middle of the induction coil 1, but with the induction coil 2 introduced, the magnetic field generated by the induction coil 2 may influence where the highest point of the output signal occurs, resulting in a slight offset.

Preferably, if there are multiple groups of induction coils, the flow velocity $v_{metal}$ of the metal particles passing through the induction coils is the average value of the flow velocities of particles passing through each group of induction coils.

For example, in S1, the flow velocity $v_{gn}$ (wherein n is a positive integer) of the metal particles passing through the $gn^{th}$ group of induction coils is respectively calculated, and the flow velocity $v_{metal}$ of the metal particles is the average value of the flow velocities of particles passing through each group of induction coils, namely:

$$v_{metal} = \frac{v_{g1} + v_{g2} + \cdots + v_{gn}}{n}$$

The calculation accuracy of the flow velocity can be improved by calculating an average value, and hence the calculation result is more accurate.

Preferably, the frequency at which the output signal of the signal detection system is acquired in S21 is once per millisecond.

The method has the following beneficial effect due to the acquisition frequency of once per millisecond: the frequency of the output signal is 500 Hz, according to the sampling theorem, the sampling frequency should be more than twice of the highest frequency of the signal, such that the complete information of the signal can be preserved without distortion, therefore, the sampling frequency of 1 K, namely, 1,000 effective signals are sampled every second (once per millisecond) for analysis.

Compared with the prior art, the present invention has the advantages as follows:

1. The detection system integrates a metal particle detection device and a particle morphology detection device, and the related information of the fluid non-metal particles can be directly obtained through the detection results of the above two devices in a convenient, fast and accurate manner;

2. In the metal particle detection device of the present detection system, the induction coil is wound outside the excitation coil, so that the installation is convenient, the whole length of the sensor is greatly shortened, and prepare and use of the device are facilitated;

3. In the metal particle detection device of the present detection system, the induction coil is wound around the detection pipeline, so that measurement of particles can be detected, without contacting the sensor directly with liquid in the pipeline, so that the test is more convenient;

4. In the metal particle detection device of the present detection system, at least two induction coils are adopted for winding around the excitation coil to ensure the detection accuracy;

5. In the metal particle detection device of the present detection system, a spacer ring sleeve is additionally arranged between the excitation coil and the induction coils and is used for isolating the excitation coil and the induction coils, so that the magnetic field loss between the induction coils and the excitation coil is reduced; meanwhile, as a frame around which the induction coils are wound, the spacer ring sleeve can improve the flatness during winding the induction coils;

6. In the metal particle detection device of the present detection system, a shielding ring is arranged outside the induction coils, so that an external magnetic field can be isolated, the interference of the external magnetic field is prevented, rendering a more accurate detection result and a better detection effect;

7. In the particle morphology detection device of the present detection system, the laser tube is arranged to be movable, so that the output light beam from the laser tube can cover the detection pipeline, particles flowing through the whole detection pipeline are detected, and the technical effect of improving detection accuracy is further achieved; 8. In the particle morphology detection device of the present detection system, the device preferably further comprises an electric motor, and the electric motor is connected with the laser tube so as to drive the laser tube to move, and the laser tube can be moved;

9. In the particle morphology detection device of the present detection system, the movement range of the laser tube is set as the diameter of the cross section of the detection pipeline, the detection pipeline can be covered to a greater extent, so that the fluid in the pipeline can be fully covered by a light beam, a full detection of particles in each layer is achieved, and the detection accuracy is improved;

10. In the particle morphology detection device of the present detection system, the laser tube moves at a constant speed, the signal of the sampled particle is stable in the process of the constant speed movement, and the accuracy of detection and analysis results is higher.

11. In the detection method of the present invention, in the step of calculating the particle concentration, elimination of the influence of the background noise value is taken into consideration, thereby rendering a calculated volume of the particles closer to the actual value, and improving the calculation accuracy of the concentration of the particles in the fluid;

12. In the detection method of the present invention, particles with a diameter of 10 μm are selected as standard particles, so that on one hand the detection accuracy can be improved, and on the other hand the detection sensitivity can be improved;

13. In the detection method of the present invention, the sampled signals are compared with the previously obtained scatter background noise value, and signals greater than the scatter background noise value are used as the effective signals, so that the sampled signals show more practicability, and the subsequent measurement result is more accurate.

14. In the detection method of the present invention, as to the counting method, the inventor chooses preferably to compare the signal value with the background noise value instead of directly taking read-out values of the signal as the count, thereby rendering a more accurate detection result and an improved detection accuracy of the concentration of the particles.

The above description is merely a summary of the technical solutions of the present invention, in order to render a more clear understanding of the technical means of the present invention to implement according to the content of the description, and in order to render the above and other objects, features and advantages of the present invention to be more readily understood, the following detailed description of the preferred embodiments is carried out taken in conjunction with the accompanying drawings.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
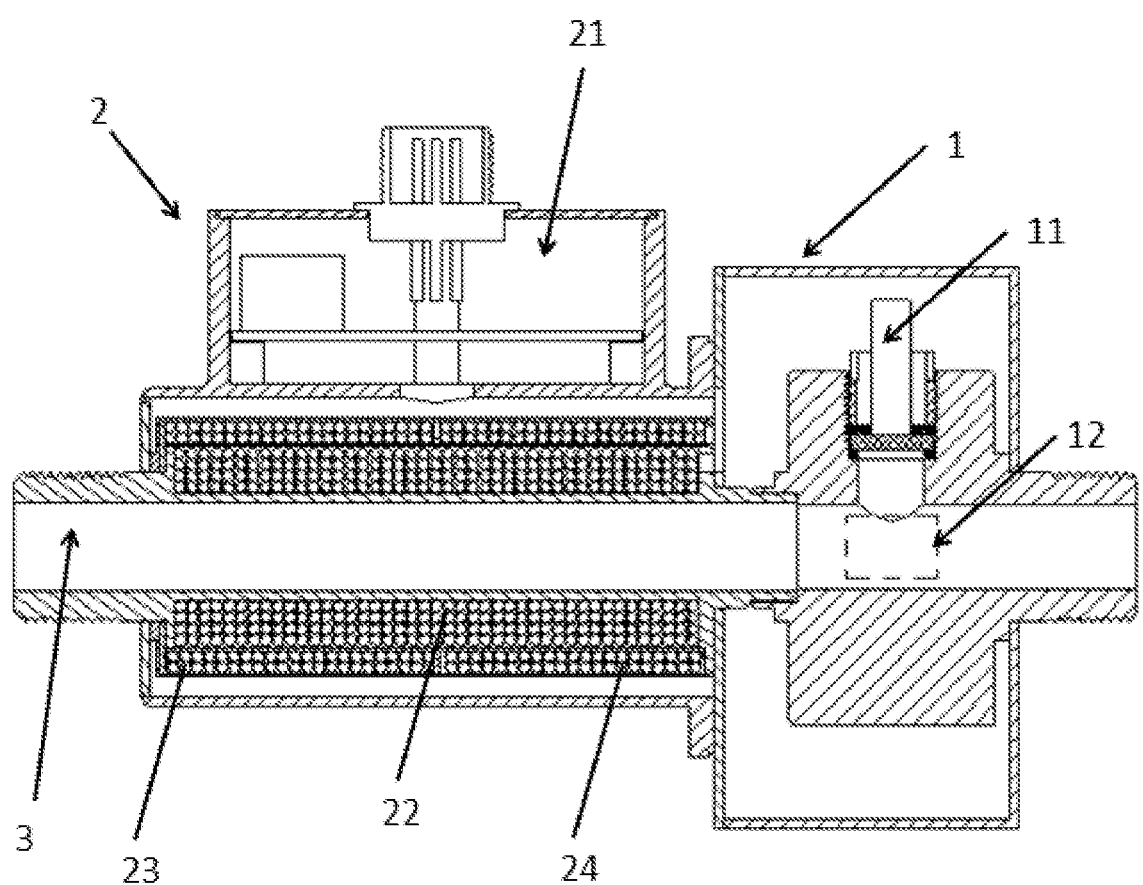
FIG. 1(a) is a schematic cross-sectional view of a preferred embodiment of the detection system of the present invention.

Reference numerals in the drawings: 1. particle morphology detection device; 2. metal particle detection device; 3. detection pipeline; 11. laser tube; 12. scatter detector; 13. electric motor; 131. gear; 132. rack; 21. signal detection system; 22. excitation coil; 23. first induction coil; 24. second induction coil; 25. spacer ring sleeve; 26. shielding ring; a. particle; b. particle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to further illustrate the technical means of the present invention for achieving the intended purposes thereof as well as effects, the following detailed description is made, taken in conjunction with the accompanying drawings and preferred embodiments, to illustrate specific embodiments, structures, features and efficacy thereof according to the present invention.

Embodiment 1 (A System for Detecting the Concentration of Non-Metal Particles in a Fluid)

Figure 1B:
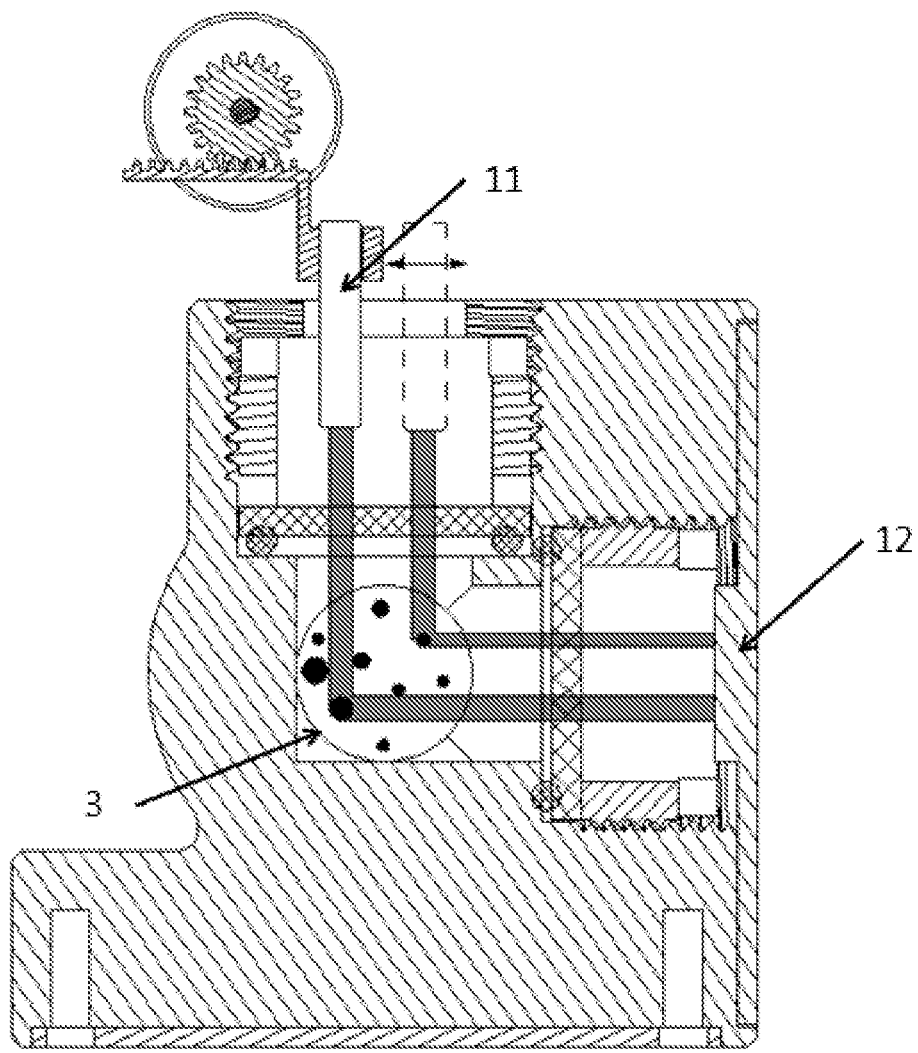
FIG. 1(b) is a right side view of a portion of a particle morphology detection device in the detection system of FIG. 1(a)

FIG. 1(a) is a structural schematic diagram of a preferred embodiment of the system for detecting non-metal particles in a fluid of the present invention, wherein the detection system comprises a particle morphology detection device 1, a metal particle detection device 2 and a detection pipeline 3, and the particle morphology detection device and the metal particle detection device are connected to each other and wound around the detection pipeline;

As shown in FIG. 1(a) and FIG. 1(b), the particle morphology detection device comprises: a laser tube 11 for outputting an incident light beam; a scatter detector 12 for detecting the emergent light beam from the fluid;

The metal particle detection device comprises a signal detection system 21, an excitation coil 22 and two induction coils (a first induction coil 23 and a second induction coil 24 respectively), wherein the excitation coil is connected with the signal detection system and wound around the detection pipeline; the induction coils are connected with the signal detection system and wound on the excitation coils sequentially and reversely with respect to each other;

The detection pipeline allows the light beam of the particle morphology detection device to be incident on and emergent from the fluid in the pipeline.

The above-mentioned is one preferred embodiment of the basic embodiments of the technical solution and has the following beneficial effects: three groups of data, namely, particle concentration, metal particle concentration and non-metal particle concentration in the fluid, can be obtained through once measurement by the device, therefore the detection efficiency is improved, and meanwhile the detection efficiency and accuracy can be effectively improved through improvement to each device of this system.

Implementations of the metal particle detection device and the particle morphology detection device are shown in more specific, different embodiments, respectively, below for ease of illustration by written words and figures. The non-metal particle detection system can be any combination of each of the embodiments of the metal particle detection device and each of the embodiments of the particle morphology detection system below, that is, only the preferred embodiments of the two detection devices are respectively displayed, but the combination of the two detection devices is not displayed, the non-metal particle detection system can be any combination of the preferred embodiments of the two detection devices.

The method for acquiring signals of non-metal particle concentration and the like comprises: respectively reading fluid metal particle concentration information and fluid particle concentration information obtained by the metal particle detection device and the particle morphology detection device, and subtracting the fluid metal particle concentration information from the fluid particle concentration information to obtain the information of non-metal particle concentration.

Embodiment 2 (A Metal Particle Detection Device in the System for Detecting the Concentration of Non-Metal Particles in a Fluid)

Figure 2:
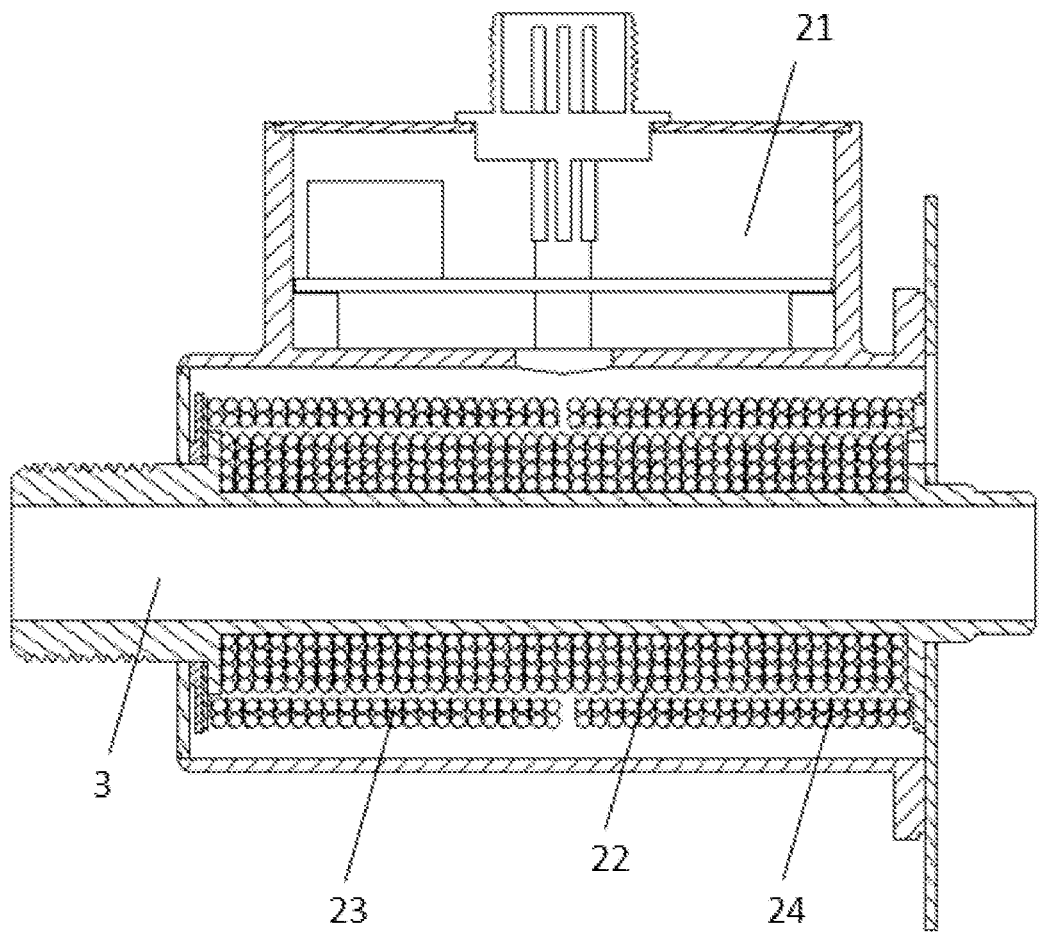
FIG. 2 is a schematic cross-sectional view of a first preferred embodiment of a metal particle detection device in the detection system of the present invention.

FIG. 2 is a schematic cross-sectional view of a first preferred embodiment of a metal particle detection device in the present detection system of the present invention;

The detection device comprises a signal detection system 21, an excitation coil 22 and two induction coils (a first induction coil 23 and a second induction coil 24 respectively), wherein the excitation coil is connected with the signal detection system and wound around the detection pipeline 3; the induction coils are connected with the signal detection system and wound on the excitation coils sequentially and reversely with respect to each other.

The above is one of the preferred embodiments of the technical solution and has the following beneficial effects:

(1) The arrangement that the induction coil is wound externally to the excitation coil of the device can achieve the effects that the installation is facilitated, the overall length of the sensor is greatly shortened, and the device is convenient to prepare and use;

(2) The induction coil of the device is wound around the detection pipeline, so that measurement of particles can be detected, without contacting the sensor directly with liquid in the pipeline, so that the test is more convenient;

(3) The induction coils are sequentially wound around the excitation coil. In this arrangement, magnetic field disturbance generated when particles pass through the induction coils can be quickly detected, so as to achieve the detection of metal particles;

(4) The induction coils are wound reversely with each other on the excitation coil. Due to the proximity of the induction coils, the environment of the induction coils can be considered to be consistent, temperature drift and electromagnetic interference can be restrained in a complex and severe environment, and thus signal stability is enhanced and system performance is further improved.

In this embodiment, there is one excitation coil for generating a magnetic field. In other embodiments, the number of the excitation coil may be two or more, but co-directional winding is required to prevent mutual interference of the magnetic fields and influence on the measurement effect.

In this embodiment, there are two induction coils. This arrangement can effectively improve the detection accuracy and ensure a better detection effect. Or in other embodiments, the number of the induction coils is a positive even number, such as four, six or more, on the one hand, the same detection effect can be achieved, and on the other hand, the detection reliability can be improved by averaging multiple measurements.

In this embodiment, the material of the detection pipeline is made of a non-magnetic conductive material; further preferably, the detection pipeline is made of stainless steel. The detection pipeline is made of a non-magnetic conductive material so as to measure the magnetic field disturbance generated by metal particles on the excitation coil more accurately. In the testing process, it's necessary to try to ensure that the magnetic field generated by the excitation coil pass through the pipeline to improve the magnetic field strength therein. More preferably, a non-magnetic conductive stainless steel material is used, which meets the requirement but does not exclude other materials.

Embodiment 3 (A Metal Particle Detection Device in the System for Detecting the Concentration of Non-Metal Particles in a Fluid)

Figure 3:
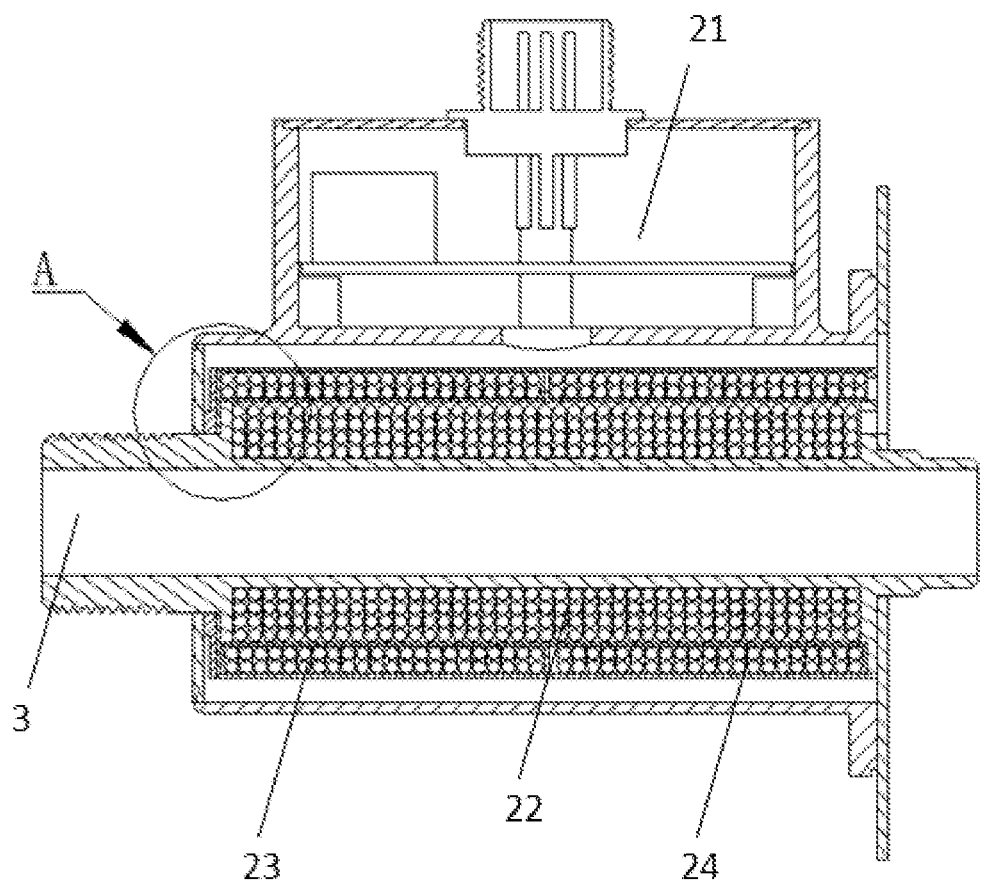
FIG. 3 is a schematic cross-sectional view of a second preferred embodiment of a metal particle detection device in the detection system of the present invention.
Figure 4:
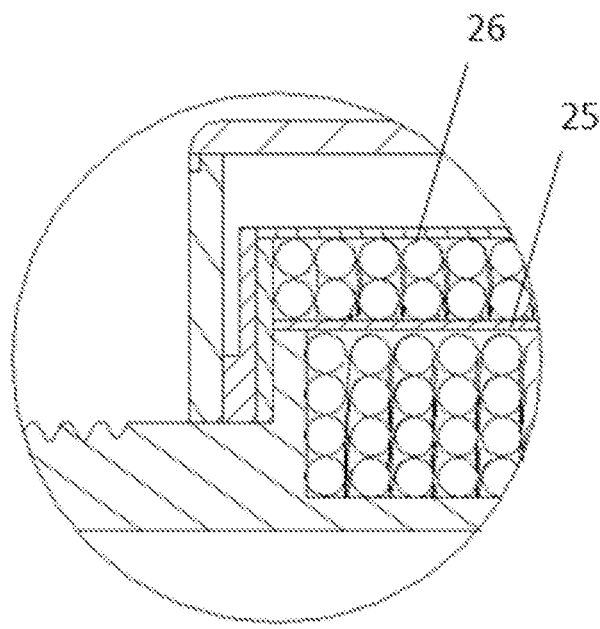
FIG. 4 is a partially enlarged schematic view of area A in FIG. 3.

FIG. 3 is a schematic cross-sectional view of a second preferred embodiment of a metal particle detection device in the present detection system of the present invention; this embodiment differs from the above-mentioned embodiment 1 in that: as shown in FIG. 4, a spacer ring sleeve 25 is further arranged between the excitation coil and the induction coils in the detection device, that is, the excitation coil is sleeved with a spacer ring sleeve, and the induction coils are wound around the spacer ring sleeve. And a shielding ring 26 is arranged outside the induction coil.

Both or one of the above technical solutions can be implemented as required. In this embodiment, both solutions are implemented, that is, a spacer ring sleeve and a shielding ring are arranged, which is a more preferred embodiment.

The arrangement of the spacer ring sleeve, on one hand, is mainly used for isolating the excitation coil and the induction coils during winding in the production and manufacturing process, and on the other hand, the spacer ring sleeve can be used meanwhile as a frame around which the induction coils are wound, thus the flatness of the induction coil winding can be improved. Further preferably, the spacer ring sleeve is made of a non-magnetic conductive material, the magnetic field loss between the induction coils and the excitation coil is minimized as much as possible in the process of responding to the magnetic field disturbance generated by the metal particles, which is advantageous to improving the detection accuracy of the metal particles, and therefore the non-magnetic conductive material is selected herein.

The arrangement of the shielding ring outside the induction coil can isolate the external magnetic field, prevent the interference of the external magnetic field, thus rendering a more accurate detection result and a better detection effect.

Figure 5:
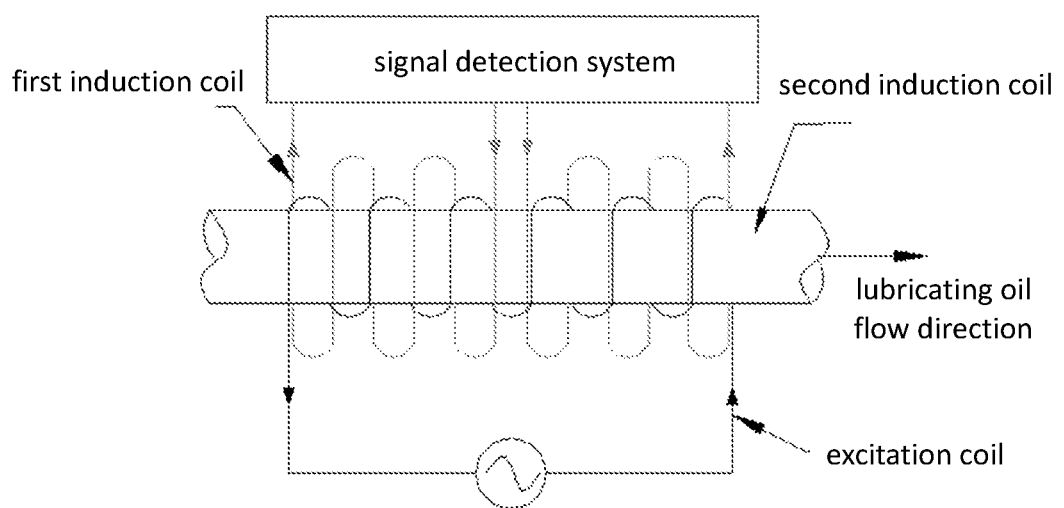
FIG. 5 is a schematic diagram showing the mechanism of electromagnetic induction detection performed by the metal particle detection device in the detection system of the present invention.
Figure 6:
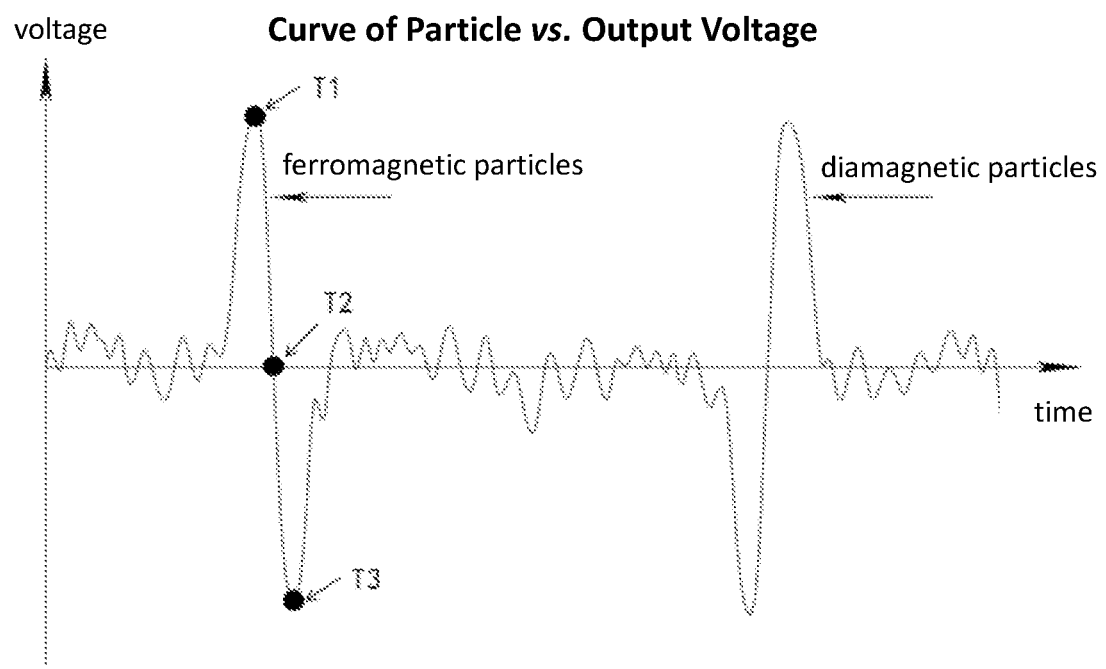
FIG. 6 is a graph of voltage output variation corresponding to the schematic diagram illustrating the mechanism of FIG. 5.

With reference to FIGS. 5 and 6, taking the arrangement in the above-described embodiment as an example, the implementation principle of the device will be described hereinafter as follows:

An alternating magnetic field can be generated by inputting a sinusoidal alternating signal at two ends of the excitation coil; under the action of an alternating magnetic field, alternating signals can be generated at two ends of the induction coil.

Depending on the magnetic conductivity of the material, metal materials can be roughly classified as diamagnetic (<1), paramagnetic (>1), and ferromagnetic (>>1). The diamagnetic material weakens the magnetic field, the paramagnetic material strengthens the magnetic field, and the ferromagnetic material greatly increases the magnetic field strength. In a circuit, opposite output ends of the two induction coils are connected, and output signals of the other two ends are measured. When no metal particles pass through the interior of the excitation coil, induction signals of the two induction coils cancel out each other, thus the overall output of the system is zero. When metal particles (ferromagnetic materials) pass through the interior of the excitation coil from left to right, the process is divided into the following stages:

(1) When the metal particles enter the first induction coil, the change of the first induction coil is relatively sensitive, and firstly the voltage value rises, but the change of the second induction coil is relatively slow, therefore, at the moment, the two ends of the induction coil output a rising positive voltage;

(2) Along with the metal particles approaching the middle, the second induction coil is also influenced, at the moment, the voltage generated by the first induction coil is slowly balanced by the voltage generated by the second induction coil and gradually decreases, and then decreases to zero in the middle of the first induction coil and the second induction coil;

(3) The metal particles pass through the first induction coil and enter the second induction coil, at the moment, the voltage value of the second induction coil is higher than that of the first induction coil, a negative voltage appears, and the voltage amplitude is continuously increasing;

(4) When the particles pass through the second induction coil and flow out of the second induction coil, the influence on the second induction coil is slowly weakened, the voltage amplitude is slowly decreasing and then approaches zero when the particles leave the second induction coil behind for a certain distance.

According to the electromagnetic induction principle, when metal particles pass through the lubricating oil pipeline from left to right, the sensor equipment can detect a signal similar to a sinusoidal wave, the amplitude of the signal is proportional to the size of the particles, and the period of the signal is proportional to the flow velocity of the particles, on such a basis, the flow velocity is calculated.

Embodiment 4 (A Particle Morphology Detection Device in the System for Detecting the Concentration of Non-Metal Particles in a Fluid)

Figure 7:
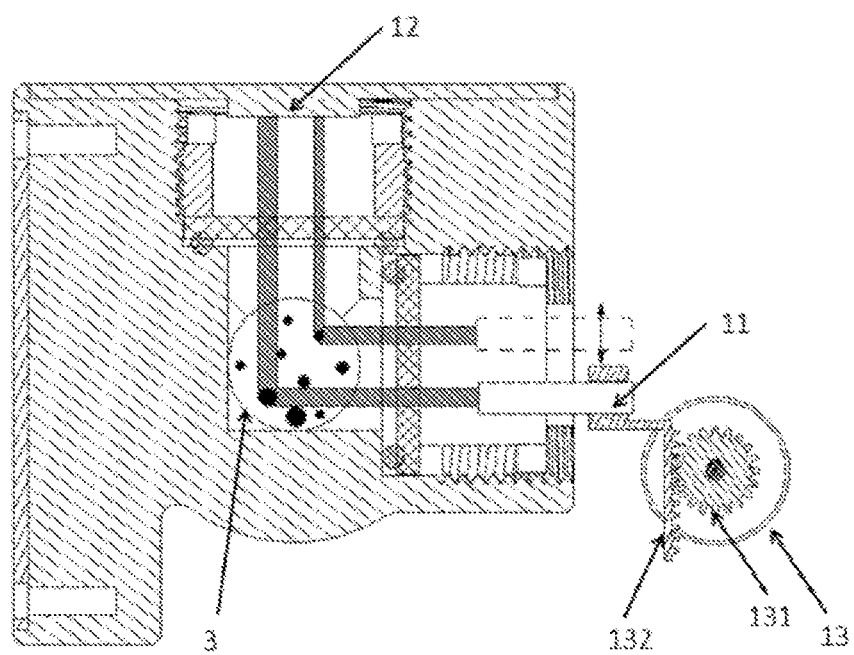
FIG. 7 is a schematic view showing the structure of a preferred embodiment of a particle morphology detection device in the detection system of the present invention.

FIG. 7 is a schematic view showing the structure of a preferred embodiment of a particle morphology detection device in the present detection system of the present invention; comprising: a detection pipeline 3 which allows a light beam to be incident and emergent from the fluid in the pipeline; a laser tube 11 for outputting the incident beam; and a scatter detector 12 for detecting the scattered beam.

The scatter detector is arranged in a plane perpendicular to the output beam from the laser tube, and the scatter detector, the detection pipeline and the laser tube form a right-angle shape with each as a vertex.

The detection device further comprises an electric motor 13 serving as a drive unit, and the electric motor is connected with the laser tube to drive the laser tube to move. The electric motor drives the laser tube to move by means of the gear 131 and the rack 132.

The specific working process of the detection device is as follows:

when the device is started, the laser tube is controlled to irradiate at the liquid at the lowest end of a travel and at the lowest layer of the detection pipeline by the electric motor, the gear and the rack, and the distribution condition of particles at the lowest layer is analyzed; and then the electric motor driving program is controlled to move the laser tube at a constant speed, so that the laser moving while scanning in the pipeline, the output signal of the photoelectric detector is collected, the condition of particles at different layers in the pipeline is analyzed, and a dynamic analysis of the distribution of the particles in the pipeline is realized. For particles with different sizes, such as relatively small particles a and relatively large particles b in the figure, due to the fact that the particles are layered according to different masses, a light beam can be movably incident in and cover the fluid in the detection pipeline by means of the device, different particles produce different scatter and transmission, thus the detection result of the photoelectric detector is more comprehensive and accurate, and the detection accuracy is further improved for detecting the transparency and the particle concentration of the fluid.

In the embodiment, the laser tube is arranged to be movable, so that the output light beam from the laser tube can cover the detection pipeline, particles flowing through the whole detection pipeline are detected, and the technical effect of improving detection accuracy is further achieved.

In the present embodiment, the movement of the laser tube is gear movement, and in other embodiments, the movement may be lead screw movement or the like.

In this embodiment, the movement range of the laser tube is the diameter of the cross section of the detection pipeline. the movement range of the laser tube is set as the diameter of the cross section of the detection pipeline, the detection pipeline can be covered to a greater extent, so that the fluid in the pipeline can be fully covered by a light beam, a full detection of particles in each layer is achieved, and the detection accuracy is improved. In other embodiments, the movement range of may vary from case to case and is not limited to the preferred embodiment of the present embodiment.

In this embodiment, the movement of the laser tube is at a constant speed. The signal of the sampled particle is stable in the process of the constant speed movement, and the accuracy of detection and analysis results is higher.

In this embodiment, the scatter detector is arranged at the plane perpendicular to the laser tube, and the scatter detector, the detection pipeline and the laser tube form a right-angle shape with each as a vertex in order to reduce interference of light beams and enable scattered light beam detection to be more accurate. In other preferred embodiments, the scatter detector is positioned out of the straight line with the output beam from the laser tube, which can also achieve the above technical effect.

Embodiment 5 (A Method for Detecting the Concentration of Non-Metal Particles in a Fluid)

A method for detecting the concentration of non-metal particles in a fluid by using the above-described detection system, the method comprising the steps of:

S1: detecting the concentration of particles in a fluid, specifically comprising:

S11: introducing a pure fluid into a detection pipeline to obtain a scatter background noise value $U_{background\ noise}$ output by the particle morphology detection device;

S12: introducing a fluid to be detected into the detection pipeline, obtaining scatter signals output by the particle morphology detection device, and obtaining voltage signals of standard particles;

S13: sampling signals of the fluid in a certain period of time, extracting effective signals, carrying out threshold value analysis on the effective signals $U_x$ obtained by sampling, and obtaining the number of particles present in the period of time; and S14: obtaining the concentration of the particles in the fluid according to the number of particles in S13;

And,

S2: detecting the concentration of metal particles in a fluid, specifically comprising:

S21: acquiring an output signal of the signal detection system to obtain a voltage amplitude change;

S22: detecting the metal particle concentration according to the obtained voltage amplitude change;

And,

S3: detecting the concentration of non-metal particles in a fluid, specifically comprising:

Acquiring the fluid particle concentration obtained in S1 and the fluid metal particle concentration obtained in S2, and the concentration of non-metal particles in the fluid is obtained through subtracting, namely:

The concentration of non-metal particles in the fluid=the fluid particle concentration− the fluid metal particle concentration.

The certain period of time in S1 may refer to any period of time, which may be chosen according to the actual situation.

The above is the basic embodiments of this detection method, the inventor has made the following improvements in order to solve the technical defects mentioned in the background and to more accurately detect the concentration of non-metal particles in the fluid: (1) improvements to particle morphology detection device and application thereof, with the detection accuracy of the fluid particle concentration improved; (2) improvements to metal particle detection device, with the accuracy of the detection of the fluid metal particle concentration improved; and (3) improvements to the method for detecting the concentration of particles in a fluid, including obtaining a scatter background noise value $U_{background\ noise}$ output by a detection device, and removing the influence caused by the background noise value in a subsequent detection calculation process, thereby improving the accuracy of the detection and calculation of the concentration of particles in the fluid. Through the above improvements, an improved accuracy of the detection of non-metallic particle concentration in the fluid is achieved.

The above-mentioned is a preferred embodiment of the basic embodiments of the technical solution and has the following beneficial effects: three groups of data, namely, particle concentration, metal particle concentration and non-metal particle concentration in the fluid, can be obtained through once measurement by the device, therefore the detection efficiency is improved, and meanwhile the detection efficiency and accuracy can be effectively improved through improvement to each device of this system.

Implementations of the metal particle concentration detection method and the fluid particle concentration detection method are shown in more specific, different embodiments, respectively, below for ease of illustration by written words and figures. The non-metal particle concentration detection method can be any combination of each of the embodiments of the metal particle concentration detection method and each of the embodiments of the fluid particle concentration detection method below, that is, only the preferred embodiments of the two detection methods are respectively displayed, but the combination of the two detection methods is not displayed, the non-metal particle detection method can be any combination of the preferred embodiments of the two detection methods.

Embodiment 6 (A Method for Detecting the Concentration of Particles in a Fluid Included in the Method for Detecting the Concentration of Non-Metal Particles in a Fluid)

This embodiment is a preferred embodiment of the method for detecting the concentration of particles in a fluid included in the method for detecting the concentration of non-metal particles in a fluid of the technical solution, in S1, the standard particles are selected from particles having a diameter of 10 μm, with a corresponding voltage signal of $U_{10\ \mu m}$.

In the actual selection process of the standard particles, if the particles are too large, the detection accuracy for the subsequent concentration calculation is decreased, and if the particles are too small, the detection sensitivity of the device is decreased, as a result the particle detection may fail. Therefore, the detection accuracy and the detection sensitivity can be effectively balanced by taking particles with a diameter of 10 μm as standard particles by the inventor, on one hand the detection accuracy can be improved, and on the other hand the detection sensitivity can be improved.

In combination with the above embodiments, in a preferred embodiment, the effective signal is extracted by comparing the sampled signals with the scatter background noise value, and selecting signals greater than the scatter background noise value as effective signals.

The sampled signals are compared with the previously obtained scatter background noise value, and signals greater than the scatter background noise value are used as the effective signals, so that the sampled signals show more practicability, and the subsequent measurement result is more accurate.

In combination with the above embodiments, in a preferred embodiment, the step of obtaining the number of particles through a threshold analysis in S13 comprises the step of:

comparing the obtained signal $U_x$ with a background noise value $U_{background\ noise}$, if $U_x - U_{background\ noise} > 0$, adding 1 to the count, and if $U_x - U_{background\ noise} < 0$, the count being zero.

In this step, as to the counting method, the inventor chooses preferably to compare the signal value with the background noise value instead of directly taking read-out values of the signal as the count, so that errors caused by the background noise value can be eliminated, that is, only signals when $U_x - U_{background\ noise} > 0$ are counted as representing particles, thereby rendering a more accurate detection result and an improved detection accuracy of the concentration of the particles.

In combination with the above embodiments, in another preferred embodiment,

S141: calculating the volume $V_x$ of the particles:

$$V_x = K \times V_{10\ \mu m} \times \sqrt{\frac{U_x - U_{background\ noise}}{U_{10\ \mu m} - U_{background\ noise}}}$$

where $V_x$ represents volume of unknown particles; K represents a sensor correction coefficient; $V_{10\ \mu m}$ represents standard particle volume; $U_x$ represents output voltage amplitude of an unknown volume of particles; $U_{10\ \mu m}$ represents output voltage amplitude of standard particles; and S142: obtaining the concentration of fluid particles:

obtaining the fluid flow velocity v, the cross-sectional area S of the detection pipeline, converting the number and volume of particles passing through the pipeline in a period of time t into a total mass $m_{total}$, and obtaining the particle concentration $c_{total}$ through the following formula:

$$c_{total} = \frac{m_{total}}{v \times t_{total} \times S}.$$

In this step, elimination the influence of the background noise value is also taken into consideration, so that the detection result is more accurate. As in the above-mentioned calculation formula of the particles, factors of subtracting $U_{background\ noise}$ from $U_x$ and subtracting $U_{background\ noise}$ from $U_{10\ \mu m}$, thereby rendering a calculated volume of the particles closer to the actual value, and improving the calculation accuracy of the concentration of the particles in the fluid.

The total mass $m_{total}$ is calculated as follows:
Calculation of the mass of a single particle $$m = \rho \times V$$

The particle herein is regarded by default as a common particle in the fluid, a relative density of the particle is substituted into the above formula and the mass of a single particle can be obtained through conversion.

Accumulation of masses of particles in a period of time is performed on the basis of calculation of the mass of a single particle to obtain the total mass of the particles in the current period of time:

$$M = \sum_{i=1}^{N} m_i.$$

Embodiment 7 (A Method for Detecting the Concentration of Metal Particles in a Fluid Included in the Method for Detecting the Concentration of Non-Metal Particles in a Fluid)

This embodiment is a preferred embodiment of the method for detecting the concentration of metal particles in a fluid included in the method for detecting the concentration of non-metal particles in a fluid of the technical solution, detecting the metal particle concentration in S2 comprises the steps of:

obtaining the flow velocity $v_{metal}$ of the metal particles passing through the induction coils;

obtaining the mass $m_{metal}$ of the metal particles; and calculating the concentration of the particles $c_{metal}$ on the basis of the metal particle flow velocity $v_{metal}$ of the metal particles, the mass $m_{metal}$ of the metal particles, the elapsed time t and the cross sectional area S of the pipeline by using the following formula:

$$c_{metal} = \frac{m_{metal}}{v_{metal} \times t_{metal} \times S}.$$

In a more preferred embodiment, the method of obtaining the metal particle flow velocity $v_{metal}$ comprises the steps of:

Respectively recording the times when the voltage amplitude of the metal particles passing through a group of induction coils measured by the signal detection system is at the highest point and at the zero point during the positive half cycle, and calculating the time difference value $\Delta T_1$ and the length $L_1$ of the corresponding induction coils; respectively recording the times when the voltage amplitude, measured by the signal detection system, is at the zero point and at the highest point during the negative half cycle, and calculating the time difference value $\Delta T_2$ and the length $L_2$ of the corresponding induction coils; and Obtaining the flow velocity according to this formula:

$$v_{metal} = \frac{\frac{k_1 \times L_1}{\Delta T_1} + \frac{k_2 \times L_2}{\Delta T_2}}{2}$$

Due to the fact that detection points at zero points are too many in the output signal, errors are likely to be caused in an actual sampling process; therefore, in this method, the highest points of the positive half cycle and the negative half cycle of the signal is selected as a time recording point to be used for flow velocity analysis.

In the process that particles flow through the lubricating oil pipeline, the length of the pipeline L is certain, $T_1$, $T_2$ and $T_3$ are sampled, wherein $T_1$ is the moment when a signal goes by the highest point of the positive half cycle, $T_2$ is the moment when the signal goes by the zero point, and $T_3$ is the moment when the signal goes by the highest point of the negative half cycle, as shown in FIG. 5; the flow velocity can be obtained by time sampling:

$$v = K \times \frac{L}{\Delta T}$$

Because different factors such as the wire (thickness, material) of each lubricating oil sensor, the number of winding turns and the interaction between the two induction coils affect the output signal, making the sensor fail to sense the middle of the induction coils, the correction coefficient K is introduced to correct the output signal. Meanwhile, analysis is carried out on the basis of two time periods, namely, $T_1$ to $T_2$ and $T_2$ to $T_3$, and the average flow velocity is taken to reduce errors.

$$v_1 = K \times \frac{L}{2 \times (T_2 - T_1)}$$
$$v_2 = K \times \frac{L}{2 \times (T_3 - T_2)}$$
$$v = \frac{v_1 + v_2}{2}$$

Wherein L is the total length through the induction coil, and L/2 is the coil length through two half cycles respectively.

The above is the calculated velocity of particles passing through one set of induction coils.

In the output signal, the amplitude of the signal is related to the size of the metal particles. When the cylindrical metal particles pass through the interior of the spiral pipe at a constant speed, the induced electromotive force is calculated as follows:

$$E = -4k\mu_0\mu_r^3 V I_0 v$$

Wherein k is a system correction coefficient, n is the density of a coil, i.e. turn number (winding turns per unit length=total turns/total length), V is a particle volume, and v is a particle flow velocity.

In a single-layer densely wound coil, the induction voltage E caused when the metal particles pass through the spiral coil induction coil is directly proportional to the volume V, the magnetic conductivity, the passing speed of the particles v, and the third power of the winding density of the coil. Through quantitative analysis on the output signal of the sensor, the volume and the mass of the metal particles flowing through the lubricating oil pipeline can be calculated through conversion. Under the condition that the lubricating oil flow velocity v is obtained, the concentration of metal particles is measured, and the method is as follows:

With the cross-sectional area S of the pipeline given, by converting the number and size of passing metal particles obtained on the basis of the amplitude value of the output signal in a period t into the total mass m, the concentration of the metal particles is obtained through the following formula:

$$c_{metal} = \frac{m_{metal}}{v_{metal} \times t_{metal} \times S}$$

In a further preferred embodiment, the frequency at which the output signal of the signal detection system is acquired in S21 is once per millisecond.

The method has the following beneficial effect due to the acquisition frequency of once per millisecond: the frequency of the output signal is 500 Hz, according to the sampling theorem, the sampling frequency should be more than twice of the highest frequency of the signal, such that the complete information of the signal can be preserved without distortion, therefore, the sampling frequency of 1 K, namely, 1,000 effective signals are sampled every second (once per millisecond) for analysis.

In a more preferred embodiment, if there are multiple groups of induction coils, the flow velocity $v_{metal}$ of the metal particles passing through the induction coils is the average value of the flow velocities of particles passing through each group of induction coils.

For example, in S1, the flow velocity $v_{gn}$ (wherein n is a positive integer) of the metal particles passing through the $gn^{th}$ group of induction coils is respectively calculated, and the flow velocity $v_{metal}$ of the metal particles flow through the induction coils is the average value of the flow velocities of particles passing through each group of induction coils, namely:

$$v_{metal} = \frac{v_{g1} + v_{g2} + \cdots + v_n}{n}$$

The calculation accuracy of the flow velocity can be improved by calculating an average value, and hence the calculation result is more accurate.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A O R B OR C), using a non-exclusive logical OR, and should not be construed to mean "at least one of A, at least one of B, and at least one of C."

The above-described embodiments are merely preferred embodiments of the present invention, and thus do not limit the scope of the present invention, and any insubstantial changes and substitutions made by those skilled in the art based on the present invention are intended to be within the scope of the present invention.

What is claimed is:

1. A system for detecting concentration of non-metal particles in a fluid, wherein the system comprises a particle morphology detection device, a metal particle detection device, and a detection pipeline, wherein the particle morphology detection device and the metal particle detection device are connected to each other and wound around the detection pipeline;
   the particle morphology detection device comprises: a laser tube for outputting an incident light beam; and a scatter detector for detecting an emergent light beam from a fluid;
   the metal particle detection device comprises a signal detection system, an excitation coil and a positive even number of induction coils, wherein the excitation coil is connected with the signal detection system and wound around the detection pipeline; the induction coils are connected with the signal detection system and wound around the excitation coil sequentially and reversely with respect to each other; and
   the detection pipeline allows a light beam of the particle morphology detection device to be incident on and emergent from the fluid in the pipeline.

2. A method for detecting concentration of non-metal particles in a fluid applying the system of claim 1, wherein the method comprises steps of:
   S1: detecting fluid particle concentration, specifically comprising:
      S11: introducing a pure fluid into the detection pipeline to obtain a scatter background noise value $U_{background\ noise}$ output by the particle morphology detection device;
      S12: introducing a fluid to be detected into the detection pipeline, obtaining scatter signals output by the particle morphology detection device, and obtaining voltage signals of standard particles;
      S13: sampling signals of the fluid in a period of time, extracting effective signals, carrying out a threshold value analysis on the effective signals $U_x$ obtained by sampling, and obtaining number of particles present in the period of time; and
      S14: obtaining the fluid particle concentration according to the number of the particles in S13;
   and
   S2: detecting fluid metal particle concentration, specifically comprising:
      S21: acquiring an output signal of the signal detection system to obtain a voltage amplitude change;
      S22: detecting the metal particle concentration according to the obtained voltage amplitude change;
   and
   S3: detecting fluid non-metal particle concentration, specifically comprising:
      acquiring the fluid particle concentration obtained in S1 and the fluid metal particle concentration obtained in S2, and the fluid non-metal particle concentration is obtained through subtracting, namely:
      the fluid non-metal particle concentration=the fluid particle concentration-the fluid metal particle concentration.

3. The method according to claim 2, wherein in S1, the standard particles are selected from particles having a diameter of 10 μm, with a corresponding voltage signal of $U_{10\mu m}$.

4. The method according to claim 2, wherein in S1, the effective signal is extracted by comparing sampled signals with the scatter background noise value, and selecting signals greater than the scatter background noise value as effective signals.

5. The method according to claim 2, wherein the step of obtaining the number of the particles through the threshold analysis in S13 comprises step of:
   comparing the obtained signal $U_x$ with the background noise value $U_{background\ noise}$, if $U_x - U_{background\ noise} > 0$, adding 1 to a count, and if $U_x - U_{background\ noise} < 0$, the count being zero.

6. The method according to claim 2, wherein the step to obtain the particle concentration in S14 comprises steps of:
   S141: calculating volume $V_x$ of the particles:

$$V_x = K \times V_{10\ \mu m} \times \sqrt{\frac{U_x - U_{background\ noise}}{U_{10\ \mu m} - U_{background\ noise}}}$$

where $V_x$ represents volume of unknown particles; K represents a sensor correction coefficient; $V_{10\mu m}$ represents volume of the standard particles; $U_x$ represents output voltage amplitude of an unknown volume of the particles; $U_{10\mu m}$ represents output voltage amplitude of the standard particles; and S142: obtaining the concentration of fluid particles:
obtaining fluid flow velocity v, cross-sectional area S of the detection pipeline, converting number and volume of particles passing through the pipeline in a period of time t into a total mass $m_{total}$, and obtaining particle concentration $c_{total}$ through following formula:

$$c_{total} = \frac{m_{total}}{v \times t_{total} \times S}.$$

7. The method according to claim 2, wherein detecting the metal particle concentration in S2 comprises steps of:
obtaining flow velocity $V_{metal}$ of metal particles passing through the induction coils;
obtaining mass $m_{metal}$ of the metal particles; and
calculating concentration of the particles $C_{metal}$ on the basis of the flow velocity $V_{metal}$ of the metal particles, the mass $m_{metal}$ of the metal particles, elapsed time t and the cross sectional area S of the pipeline by using following formula:

$$c_{metal} = \frac{m_{metal}}{V_{metal} \times t_{metal} \times S}.$$

8. The method according to claim 2, wherein in S2, the method of obtaining the flow velocity $V_{metal}$ of the metal particles comprises steps of:
respectively recording the times when voltage amplitude of the metal particles passing through a group of induction coils measured by the signal detection system is at highest point and at zero point during positive half cycle, and calculating time difference value $\Delta T_1$ and length $L_1$ of corresponding induction coils; respectively recording times when voltage amplitude, measured by the signal detection system, is at zero point and at highest point during negative half cycle, and calculating time difference value $\Delta T_2$ and length $L_2$ of the corresponding induction coils; and
obtaining the flow velocity according to formula:

$$v_{metal} = \frac{\frac{k_1 \times L_1}{\Delta T_2} + \frac{k_1 \times L_1}{\Delta T_2}}{2}.$$

9. The method according to claim 2, wherein if there are multiple groups of the induction coils, the flow velocity $V_{metal}$ of the metal particles passing through the induction coils is an average value of flow velocities of the particles passing through each said group of induction coils.

10. The method according to claim 2, wherein frequency at which the output signal of the signal detection system is acquired in S21 is once per millisecond.

11. The system of claim 1, further comprising an additional excitation coil, wherein the excitation coil and the additional excitation coil are wound around the detection pipeline in the same direction.

12. The system of claim 1, wherein at least one of the excitation coil and the induction coils are wound in at least one layer.

13. The system of claim 1, further comprising a spacer ring sleeve further arranged between the excitation coil and the induction coils.

14. The system of claim 1, further comprising a shielding ring arranged outside the induction coils.

15. The system of claim 1, wherein the particle morphology detection device further comprises a drive unit for driving the laser tube to move.

16. The system of claim 1, wherein a movement of the laser tube is a lead screw movement or a gear movement.

17. The system of claim 1, wherein a movement range of the laser tube is the diameter of the cross section of the detection pipeline.

18. The system of claim 1, wherein a movement of the laser tube is at a constant velocity.

19. The system of claim 1, wherein the scatter detector is positioned out of the straight line with an output beam from the laser tube.

20. The system of claim 1, wherein the scatter detector is arranged in a plane perpendicular to an output beam from the laser tube, and the scatter detector, the detection pipeline and the laser tube form a right-angle shape with each as a vertex.

21. The system of claim 1, wherein a first turn of the excitation coil and a second turn of a first induction coil of the induction coils are disposed between a third turn of the excitation coil and a fourth turn of the first induction coil of the induction coils.

22. The system of claim 21, wherein a fifth turn of the excitation coil and a sixth turn of a second induction coil of the induction coils are disposed between a seventh turn of the excitation coil and an eighth turn of the second induction coil of the induction coils, and
the first induction coil and the second induction coil are would around the excitation coil in opposite directions.

* * * * *